United States Patent [19]

Creighton et al.

[11] Patent Number: 5,340,557
[45] Date of Patent: Aug. 23, 1994

[54] $^{32}$P THIOPHOSPHATE PREPARATION

[75] Inventors: Andrew M. Creighton, London; William A. Jeffery, Essex, both of England

[73] Assignee: British Technology Group Limited, London, United Kingdom

[21] Appl. No.: 107,836

[22] PCT Filed: Feb. 25, 1992

[86] PCT No.: PCT/GB92/00339

§ 371 Date: Aug. 30, 1993

§ 102(e) Date: Aug. 30, 1993

[87] PCT Pub. No.: WO92/14679

PCT Pub. Date: Sep. 3, 1992

[30] Foreign Application Priority Data

Feb. 25, 1991 [GB] United Kingdom ............... 9103886.9

[51] Int. Cl.$^5$ ..................... C01B 25/10; C01B 25/14
[52] U.S. Cl. ........................ 423/300; 423/303
[58] Field of Search .................. 423/300, 301, 303

[56] References Cited

U.S. PATENT DOCUMENTS

3,061,405 10/1962 Olah et al. ...................... 423/303
3,399,963 9/1968 Brois ............................... 423/303

FOREIGN PATENT DOCUMENTS 1171639 7/1984 Canada ........................... 423/303
WO90/11289 3/1990 PCT Int'l Appl. .

OTHER PUBLICATIONS

Chemical Abstracts, vol. 102 No. 27 (Jun. 17, 1987), (Columbus, Ohio, US), Abstract #206089u, p. 128.
Chemical Abstracts, vol. 88 No. 16 (Apr. 17, 1978), (Columbus, Ohio, US), Washburn et al., Abstract #114500k, p. 632.

*Primary Examiner*—Wayne Langel
*Attorney, Agent, or Firm*—Nixon & Vanderhye

[57] ABSTRACT

$^{32}$P-Thiophosphates of the general formula:

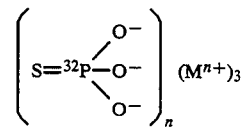

wherein n = 1, 2 or 3 and each M, which may be the same or different, is H or a cation, are prepared by heating $H_3{}^{32}PO_4$ or a salt thereof with at least an equivalent amount of a thiophosphoryl halide and then treating the reaction product with an aqueous medium to hydrolyse the reaction product and form the $^{32}$P thiophosphate.

12 Claims, 1 Drawing Sheet

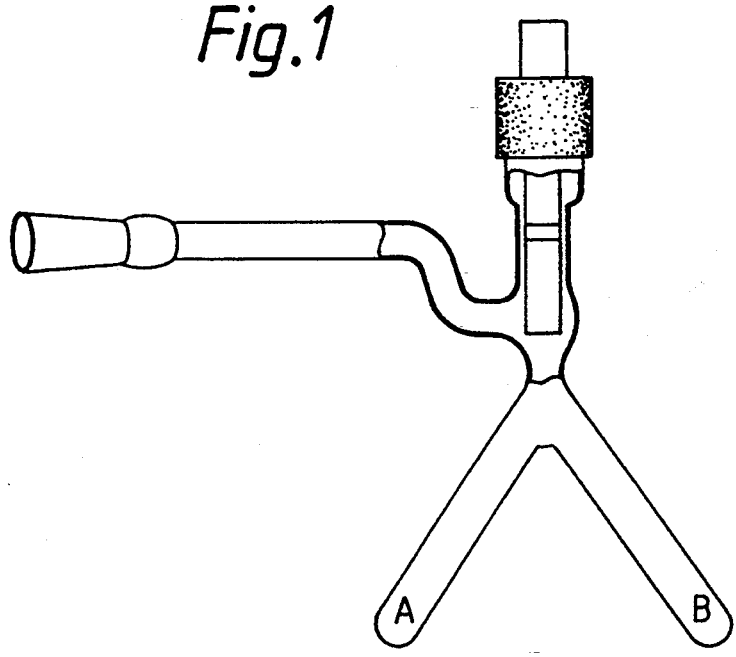

32P THIOPHOSPHATE PREPARATION

The present invention relates to a novel process for the preparation of $^{32}$P-thiophosphates.

Our published PCT Patent Application WO90/11289 describes the preparation of nucleoside thiotriphosphates carrying $^{32}$P in the gamma-thiophosphate group, which comprises reacting a nucleoside diphosphate with a $^{32}$P labelled thiophosphate salt. One problem is that the only methods available for the preparation of these $^{32}$P thiophosphates are time consuming and specific activities and yields are often low.

We have investigated the reaction of $H_3{}^{32}PO_4$ with thiophosphoryl halides and have discovered that $^{32}$P thiophosphates are obtained in high yield if the involatile portion of the reaction product is hydrolysed with an aqueous medium, preferably of pH at least 7.5.

Accordingly the present invention provides a novel process for the preparation of $^{32}$P thiophosphates of the general formula:

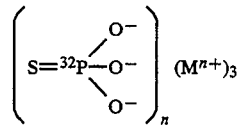

wherein n = 1, 2 or 3 and each M, which may be the same or different, is H or a cation, which comprises heating $H_3{}^{32}PO_4$ or a salt thereof with at least an equivalent amount of a thiophosphoryl halide and then treating the reaction product, after the removal of excess unreacted thiophosphoryl halide, with an aqueous medium, preferably of pH at least 7.5, to hydrolyse the reaction product and form the $^{32}$P thiophosphate.

The cation is usually an alkali metal or alkaline earth metal, but is preferably sodium. The thiophosphoryl halide is preferably chloride or bromide.

In the accompanying Drawing, FIG. 1 illustrates apparatus in which the reaction of the invention may take place.

It is preferred to react the $H_3{}^{32}PO_4$ in the form of a salt in which one or two but not all three of the acidic hydrogens are replaced by a cation, preferably an alkali metal cation or a quaternary ammonium cation. One particularly preferred reactant is $LiH_2{}^{32}PO_4$. The use of a salt of this type has the effect of reducing the extent of $^{32}$P exchange into reaction by-products e.g. $^{32}PSCl_3$ when the intermediate reaction product is hydrolysed and so increases the specific activity of the desired $^{32}$P thiophosphate product. It is also desirable to wash the inside surfaces of the reactor first with acid e.g. HCl, and then with deionised water, before the condensation reaction commences, to remove surface bound cations.

The reaction between the thiophosphoryl halide and $H_3{}^{32}PO_4$ gives rise to a novel diphosphetane intermediate of the formula:

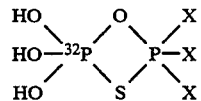

wherein X is halogen, preferably chloro or bromo, and such diphosphetane intermediates form a further aspect of the invention.

The aqueous medium is preferably alkaline and has a pH usually in the range 7.5-14 and is preferably buffered at that pH. It is preferred to use a non-phosphate buffer, such as Tricine (N-tris[hydroxymethyl]methylglycine) or a borate buffer, to avoid dilution of the labelled thiophosphate with unlabelled orthophosphate at the end of the reaction. The hydrolysis of the intermediate diphosphetane reaction product can also be brought about using an aqueous medium of pH less than 7 and treatment of the diphosphetane with an aqueous medium of pH as low as 2.5 for several hours results in formation of the desired $^{32}$P thiophosphate.

The reaction may be carried out using a large excess of the thiophosphoryl halide in the presence of only a few picomoles of $H_3{}^{32}PO_4$, allowing the preparation of a high specific activity product on a very low scale. The reaction is normally carried out in the absence of solvent, preferably under anhydrous conditions, using temperatures between 100°-200° C., preferably between 150°-180° C. The reaction is carried out over preferably at least about 1 hour, but usually over 12 to 60 hours.

Where the reaction product is not a salt in which all 3M groups are cations, it is preferred to convert the reaction product to such a salt, each cation preferably being an alkali metal e.g., sodium, as such salts are preferred for reaction with the nucleoside diphosphate in the process of the above-mentioned WO90/11289.

The following Example illustrates the present invention.

Preparation of High-specific Activity $^{32}$P-labelled Sodium Thiophosphate

A solution of "carrier-free" $H_3{}^{32}PO_4$ (2μCi, ca 0.2 p moles, PBK 8855, Amersham International) in water (10 μl) was introduced to the bottom of the sidearm A (in the apparatus of FIG. 1) with a plastic tipped pipette. The contents of sidearm A were then frozen with liquid nitrogen and the vessel evacuated to 0.5 mm mercury while connected to a $P_2O_5$ drying trap. After half an hour, the drying of the $H_3{}^{32}PO_4$ was completed by heating it, still under vacuum, at 150° C. for one hour a silicone oil bath. The vessel was then cooled, dry nitrogen admitted and thiophosphoryl chloride (10 μl) introduced to the bottom of the sidearm A while flushing gently with dry nitrogen. This was then sealed by closing the stopcock and the whole of both sidearms was then immersed in silicone oil at 180° C. for 60 hours. Both limbs were then refrozen in liquid nitrogen, the stopcock opened and the apparatus evacuated to 0.5 mm mercury. The apparatus was then resealed and sidearm A allowed to warm to room temperature while sidearm B was immersed in liquid nitrogen. This resulted in distillation of all the free thiophosphoryl chloride containing 1-2% of exchanged $^{32}$P into B. The residue, consisting of the involatile cyclic derivative 1-oxa-3-thia-2,2,2-trichloro-4,4,4-trihydroxy-2,4-diphosphetane and related condensed products, was dissolved in Tricine buffer (100 μl, 100 mM) at pH 8.0 containing dithio-threitol (10 mM) which led to the release of thiophosphate ions. A sample (20 μl) was run on a polyethyleneimine/cellulose TLC plate (E. Merck Art. 5579) in 1M sodium formate at pH 3.4 Radioactivity was associated with the slow-running blue spot (ammonium molybdate spray) derived from a sample of non-radioactive sodium thiophosphate (Rf ca 0.3) (Alfa Inorganics). Our batch of commercial material also contained a significant proportion (ca. 30%) of sodium orthophosphate, evidenced by a faster running yellow spot (Rf ca. 0.7).

When the solution of the diphosphetane in aqueous buffer (10 μl) is hydrolysed with concentrated hydrochloric acid (10 μl) at 40° C. for 20 minutes and the product is run in the same TLC system, all the radioactivity runs at Rf ca. 0.7, indicating that, under acid conditions, all the thiophosphate had been hydrolysed to orthophosphate.

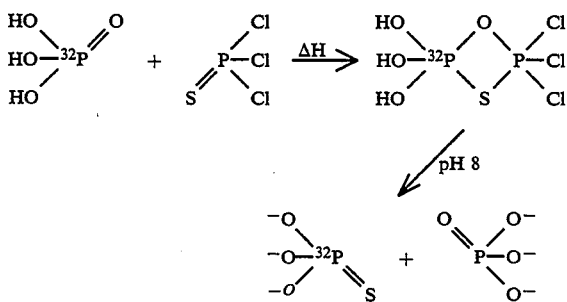

The $^{32}$P-labelled sodium thiophosphate prepared in this way is accompanied by one equivalent of non-radioactive sodium orthophosphate. This can either be removed by TLC procedures as outlined above, or the product used directly to prepare $^{32}$P-labelled adenosine thiotriphosphate, when the adenosine triphosphate formed can be removed for example by column chromatography on diethylaminoethylsepharose.

We claim:

1. A process for the preparation of a $^{32}$P thiophosphate of the general formula:

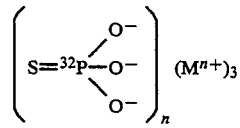

wherein n=1, 2 or 3 and each M, which may be the same or different, is H or a cation, which comprises heating $H_3{}^{32}PO_4$ or a salt thereof with at least an equivalent amount of a thiophosphoryl halide and then treating the reaction product with an aqueous medium to hydrolyse the reaction product and form the $^{32}$P thiophosphate.

2. A process according to claim 1 wherein the pH of the aqueous medium is at least 7.5.

3. A process according to claim 1 wherein the aqueous medium is buffered at the desired pH.

4. A process according to claim 1 wherein the thiophosphoryl halide is reacted with an alkali metal dihydrogen $^{32}$P-orthophosphate.

5. A process according to claim 4 wherein the orthophosphate is $LiH_2{}^{32}PO_4$.

6. A process according to claim 1 wherein the reaction product is one in which each M is an alkali metal or an alkaline earth metal cation or wherein the reaction product is converted to one in which each M is an alkali metal or alkaline earth metal cation.

7. A process according to claim 6 wherein the cation is sodium.

8. A process according to claim 1 wherein the heating is carried out at from 150° to 180° C. for 1 to 60 hours.

9. A diphosphetane of the formula:

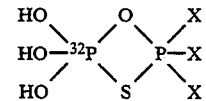

wherein X is halogen.

10. A diphosphetane according to claim 9 wherein the halogen is chloro or bromo.

11. A process for the preparation of a diphosphetane as defined in claim 9 which comprises heating $H_3{}^{32}PO_4$ or a salt thereof with at least an equivalent amount of a thiophosphoryl halide.

12. A process according to claim 11 wherein the heating is carried out at 150° to 180° C. for 1 to 60 hours.

* * * * *